United States Patent
Kubota

(10) Patent No.: US 10,230,862 B2
(45) Date of Patent: Mar. 12, 2019

(54) INFORMATION PROCESSING SYSTEM AND INFORMATION PROCESSING METHOD

(71) Applicant: Hajime Kubota, Kanagawa (JP)

(72) Inventor: Hajime Kubota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/331,175

(22) Filed: Oct. 21, 2016

(65) Prior Publication Data

US 2017/0126919 A1 May 4, 2017

(30) Foreign Application Priority Data

Oct. 28, 2015 (JP) ................................ 2015-212305

(51) Int. Cl.
| | | |
|---|---|---|
| G06F 3/12 | (2006.01) | |
| H04N 1/00 | (2006.01) | |
| G06K 15/00 | (2006.01) | |

(52) U.S. Cl.
CPC ..... *H04N 1/00941* (2013.01); *H04N 1/00411* (2013.01); *H04N 1/00557* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2008/0201555 A1* | 8/2008 | Ooshio | H04N 1/00384 |
| | | | 712/29 |
| 2009/0073470 A1 | 3/2009 | Kubota | |
| 2012/0033251 A1 | 2/2012 | Okada et al. | |
| 2012/0147404 A1 | 6/2012 | Kubota et al. | |
| 2012/0188601 A1 | 7/2012 | Kutsuwada et al. | |
| 2012/0268783 A1 | 10/2012 | Nakahara | |
| 2013/0057916 A1 | 3/2013 | Kubota et al. | |
| 2013/0088737 A1 | 4/2013 | Iwasa et al. | |
| 2014/0226181 A1 | 8/2014 | Shibukawa et al. | |
| 2014/0258913 A1 | 9/2014 | Shibukawa et al. | |
| 2014/0268225 A1 | 9/2014 | Shibukawa et al. | |
| 2014/0325526 A1 | 10/2014 | Nagata et al. | |

(Continued)

FOREIGN PATENT DOCUMENTS

| | | |
|---|---|---|
| JP | 2012-226662 | 11/2012 |
| JP | 2016-091334 | 5/2016 |

*Primary Examiner* — Dov Popovici
(74) *Attorney, Agent, or Firm* — Oblon, McClelland, Maier & Neustadt, L.L.P.

(57) ABSTRACT

An information processing system includes: a first unit that receives an operation input; and a second unit that is formed independently from the first unit and operates in accordance with the operation input, wherein the first unit includes a common managing unit that, with regard to an additional application that is an application that may be added to the first unit, controls import or export of first setting information about a setting of the additional application; and a setting managing unit that, with regard to an internal application that is an application previously installed in the first unit, controls import or export of second setting information about a setting of the internal application, communicates with the common managing unit, combines the second setting information and the first setting information, and transmits combined information to the second unit.

12 Claims, 11 Drawing Sheets

(56) References Cited

U.S. PATENT DOCUMENTS

2015/0002888 A1\* 1/2015 Tsujimoto .......... H04N 1/00464
                                                    358/1.14
2015/0156353 A1   6/2015 Kubota
2016/0127574 A1   5/2016 Kubota \* cited by examiner

FIG.5

| APP ID | ITEM ID | ITEM NAME | CONFIDENTIAL INFORMATION | UNIQUE INFORMATION | SETTING VALUE |
|---|---|---|---|---|---|
| 3 | 10000001 | SOUND VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| ... | ... | ... | ... | ... | ... |

FIG.6

| APP ID | ITEM ID | ITEM NAME | CONFIDENTIAL INFORMATION | UNIQUE INFORMATION | SETTING VALUE |
|---|---|---|---|---|---|
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

FIG.7

| APP ID | ITEM ID | ITEM NAME | CONFIDENTIAL INFORMATION | UNIQUE INFORMATION | SETTING VALUE |
|---|---|---|---|---|---|
| 3 | 10000001 | SOUND VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

FIG.8

| APP ID | ITEM ID | ITEM NAME | CONFIDENTIAL INFORMATION | UNIQUE INFORMATION | SETTING VALUE |
|---|---|---|---|---|---|
| 1 | 50000001 | DEFAULT PAPER-FEEDING TRAY | FALSE | FALSE | TRAY 1 |
| 1 | 50000002 | DEFAULT PAPER-EJECTION TRAY | FALSE | FALSE | MAIN-BODY PAPER EJECTION |
| ... | ... | ... | ... | ... | ... |
| 3 | 10000001 | SOUND VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2015-212305 filed Oct. 28, 2015. The contents of which are incorporated herein by reference in their entirety.

BACKGROUND OF THE INVENTION

1. Field of the Invention

The present invention relates to an information processing system and an information processing method.

2. Description of the Related Art

There are image forming apparatuses that include, in addition to a main body unit that provides existing functions of the image forming apparatus, an operating unit that includes the operating system (OS) and applications that are operated in the OS to perform various functions, thereby providing various functions using the existing functions. The image forming apparatus has the function to output (export) the setting information (setting values) with regard to various functions and the function to input (import) the setting information with regard to various functions. These functions are used in a case where the same settings are collectively made in multiple devices, the same settings are made before and after the devices are replaced, or the like.

Japanese Unexamined Patent Application Publication No. 2012-226662 discloses that the level of import is determined by comparing the device identification information, acquired from the setting information input from the connected device, and the device identification information on the subject device, and the import is executed in accordance with the level.

However, there is a demand that the above-described conventional technology is applied to the configuration that includes multiple units, such as the main body unit or the operating unit, and operations of high-reliability applications are not affected, while an import/export process is normally completed in the entire system.

In view of the above described demand, there is a need to provide an information processing system that makes it possible to normally complete an import/export process in the configuration that includes multiple units.

SUMMARY OF THE INVENTION

According to exemplary embodiments of the present invention, there is provided an information processing system comprising: a first unit that receives an operation input; and a second unit that is formed independently from the first unit and operates in accordance with the operation input, wherein the first unit includes a common managing unit that, with regard to an additional application that is an application that may be added to the first unit, controls import or export of first setting information about a setting of the additional application; and a setting managing unit that, with regard to an internal application that is an application previously installed in the first unit, controls import or export of second setting information about a setting of the internal application, communicates with the common managing unit, combines the second setting information and the first setting information, and transmits combined information to the second unit.

Exemplary embodiments of the present invention also provide an information processing system comprising: a first unit that receives an operation input, the first unit including circuitry that executes functions of the first unit; and a second unit that is formed independently from the first unit and operates in accordance with the operation input, the second unit including circuitry that executes functions of the second unit, wherein the circuitry of the first unit is configured to control, with regard to an additional application that is an application that may be added to the first unit, import or export of first setting information about a setting of the additional application; and control, with regard to an internal application that is an application previously installed in the first unit, import or export of second setting information about a setting of the internal application, combines the second setting information and the first setting information, and transmits combined information to the second unit.

Exemplary embodiments of the present invention also provide an information processing method that is implemented by a first unit included in an information processing system that includes the first unit that receives an operation input and a second unit that is formed independently from the first unit and operates in accordance with the operation input, the information processing method comprising: with regard to an additional application that is an application that may be added to the first unit, controlling import or export of first setting information about a setting of the additional application; and with regard to an internal application that is an application previously installed in the first unit, controlling import or export of second setting information about a setting of the internal application, combining the second setting information and the first setting information, and transmitting combined information to a second unit.

BRIEF DESCRIPTION OF THE DRAWINGS

FIG. 5 is a diagram that illustrates an example of the setting information that is processed by an operating-unit application;

FIG. 6 is a diagram that illustrates an example of the setting information that is processed by an operating-unit application;

FIG. 7 is a diagram that illustrates an example of the setting information that is transmitted and received between an operating unit and a main body unit;

FIG. 8 is a diagram that illustrates an example of the setting information that is finally generated by a setting managing unit of the main body unit;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
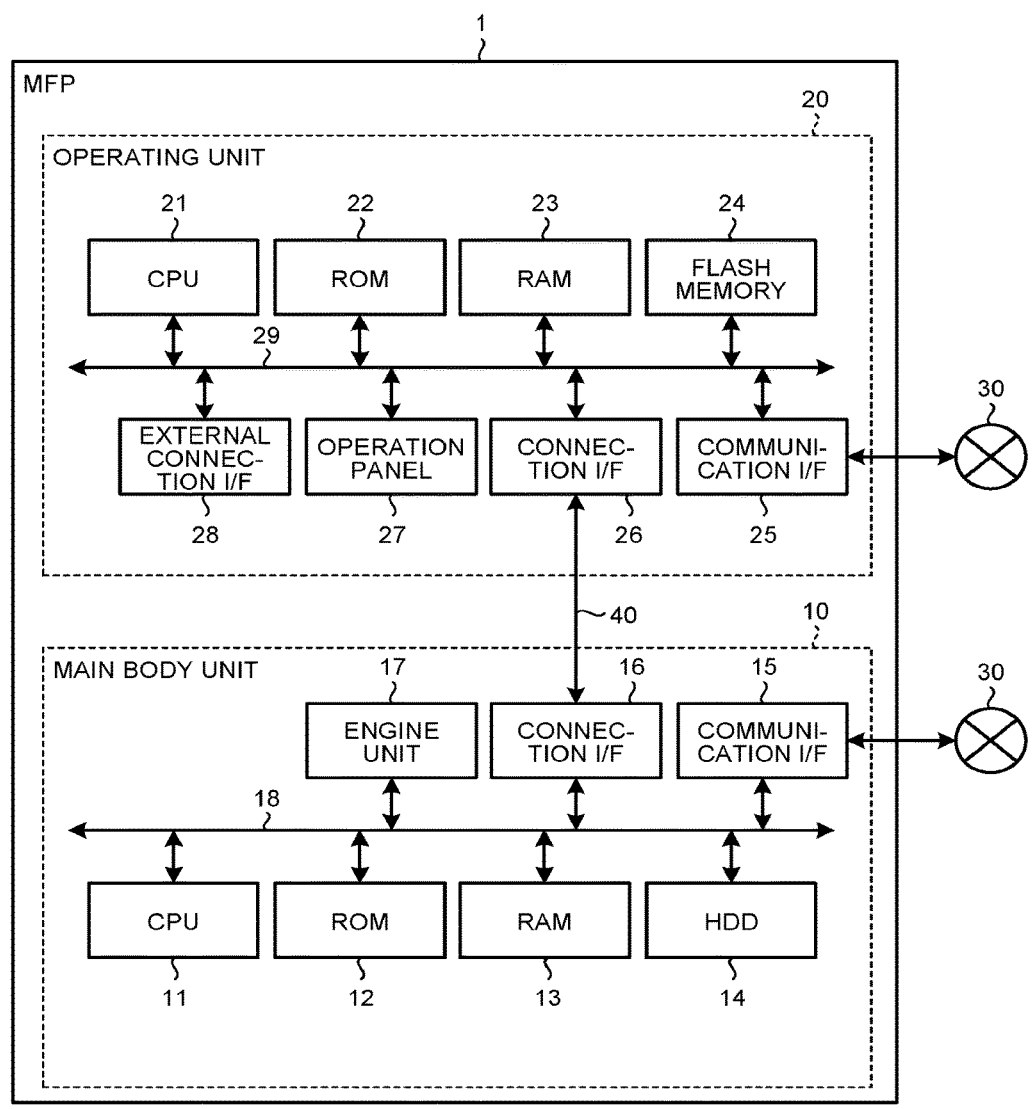
FIG. 1 is a diagram that illustrates an example of the hardware configuration of an MFP according to an embodiment of the present invention.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An explanation is given below of an embodiment of an information processing system and an information processing method according to the present invention. For example, an explanation is given of a case where a multifunction peripheral (MFP), which has at least two functions out of the copy function, the printer function, the scanner function, the fax function, or the like, is implemented as an information processing system. Furthermore, in addition to the MFP, an image forming apparatus, such as a copier, printer, scanner device, or fax device, is applicable. Moreover, applicable systems (devices) are not limited to the image forming apparatuses, but any devices are applicable as long as they are the systems (devices) that include a main body unit and an operating unit.

[Example of the Hardware Configuration of the MFP]

FIG. 1 is a diagram that illustrates an example of the hardware configuration of an MFP according to the present embodiment. As illustrated in FIG. 1, an MFP 1 includes a main body unit 10 and an operating unit 20. The main body unit 10 implements various functions, such as the copy function, scanner function, fax function, or printer function. The operating unit 20 receives information (operation input) that corresponds to the user's operation. Here, receiving the user's operation includes receiving information (including signals that indicate a coordinate value on the screen, or the like) input in accordance with the user's operation. The information input through the operating unit 20 is transmitted as commands or information to the main body unit 10, and the corresponding process is performed on the side of the main body unit 10. In the MFP 1, the operating unit 20 is an example of a first unit, and the main body unit 10 is an example of a second unit.

The main body unit 10 and the operating unit 20 are connected such that they can communicate with each other via a connection I/F 16, a dedicated communication path 40, and a connection I/F 26. The communication path 40 may use, for example, a Universal Serial Bus (USB) standard; however, it may be any standard regardless of whether it is wired or wireless.

The main body unit 10 performs a process that corresponds to the operation that is received by the operating unit 20. Furthermore, the main body unit 10 is capable of communicating with an external device, such as a client personal computer (PC), and it is also capable of performing an operation that corresponds to the command (print command, or the like) that is received from an external device.

The main body unit 10, illustrated in FIG. 1, includes a CPU 11, a ROM 12, a RAM 13, a hard disk drive (HDD) 14, a communication interface (I/F) 15, the connection I/F 16, and an engine unit 17. The CPU 11, the ROM 12, the RAM 13, the HDD 14, the communication I/F 15, the connection I/F 16, and the engine unit 17 are connected to one another via a system bus 18.

The CPU 11 controls operations of the main body unit 10 in an integrated manner. The CPU 11 executes programs (applications) stored in the ROM 12, the HDD 14, or the like, by using the RAM 13 as a work area (task area) so as to control the overall operation of the main body unit 10, thereby implementing various functions, such as the above-described copy function, scanner function, fax function, or printer function. Furthermore, these functions are implemented when the applications, corresponding to the functions, are executed.

The communication I/F 15 is an interface for connecting to a network 30. The connection I/F 16 is an interface for communicating with the operating unit 20 via the communication path 40.

The engine unit 17 is the hardware for implementing the copy function, scanner function, fax function, printer function, or the like. For example, the engine unit 17 includes a scanner (image read unit) that scans and reads images of a document; a plotter (image forming unit) that conducts printing on sheet materials, such as paper; a fax unit that performs fax communication; or the like. The engine unit 17 may include the hardware for performing specific options, such as a finisher that sorts printed sheet materials or an automatic document feeder (ADF) that automatically feeds documents.

The operating unit 20, illustrated in FIG. 1, includes a CPU 21, a ROM 22, a RAM 23, a flash memory 24, a communication I/F 25, the connection I/F 26, an operation panel 27, and an external connection I/F 28. The CPU 21, the ROM 22, the RAM 23, the flash memory 24, the communication I/F 25, the connection I/F 26, the operation panel 27, and the external connection I/F 28 are connected to one another via a system bus 29.

The CPU 21 controls operations of the operating unit 20 in an integrated manner. The CPU 21 executes programs stored in the ROM 22, the flash memory 24, or the like, by using the RAM 23 as a work area (task area) so as to control the overall operation of the operating unit 20, thereby implementing various functions, such as display of the information (image) that corresponds to the input received from a user.

The communication I/F 25 is an interface for connecting to the network 30. The connection I/F 26 is an interface for communicating with the main body unit 10 via the communication path 40.

The operation panel 27 receives various types of inputs that correspond to user's operations, and it displays various types of information (e.g., the information that corresponds to a received operation, the information that indicates the operation state of the MFP 1, or the information that indicates the setting state). The operation panel 27 is configured with a liquid crystal display (LCD) that has, for example, a touch panel function; however, this is not a limitation, and it may be configured with an organic EL display device that has a touch panel function. Furthermore, the operation panel 27 may be provided with an operating unit, such as hardware keys, or a display unit, such as a lamp.

The external connection I/F 28 is an interface for connecting to, for example, an IC card reader.

[Example of the Functional Block of the MFP]

Figure 2:
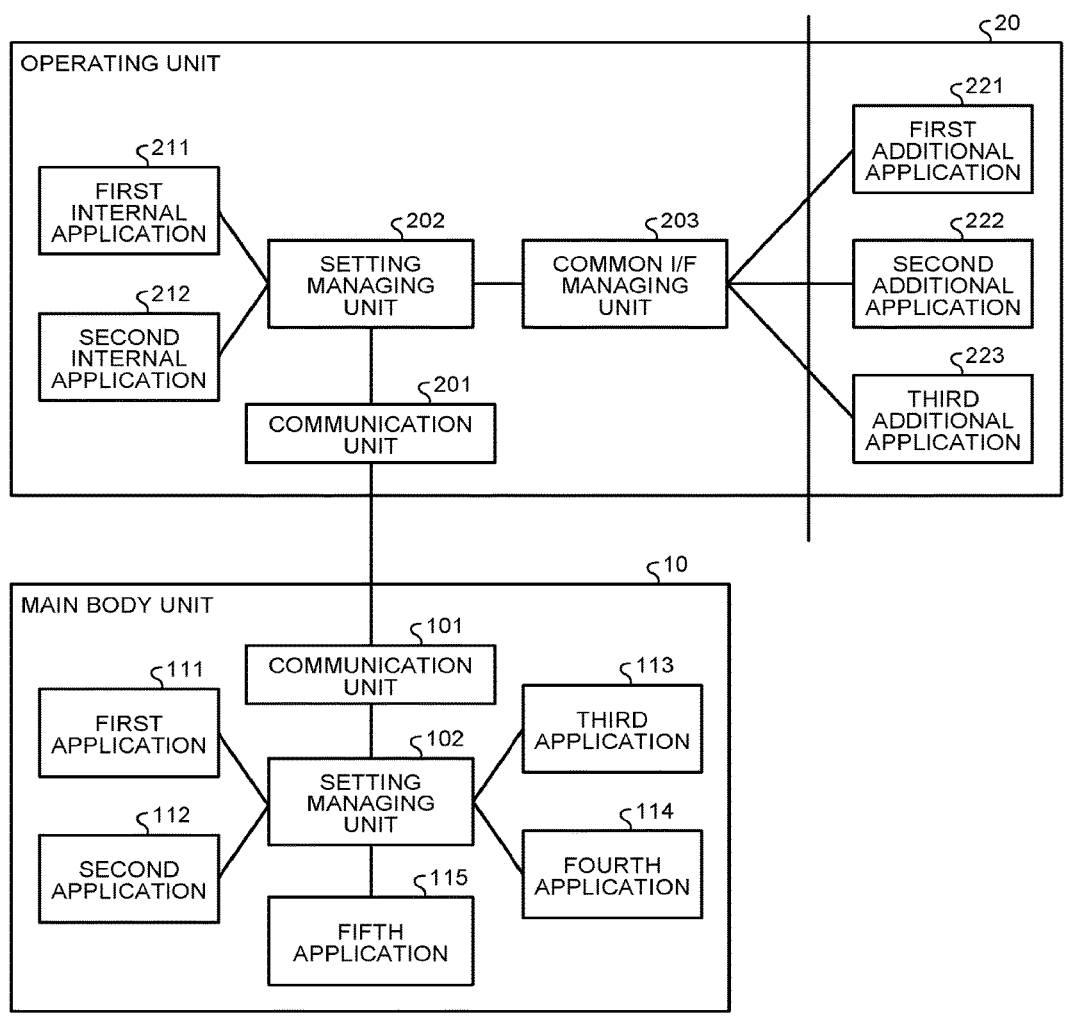
FIG. 2 is a diagram that illustrates an example of the functional block of the MFP according to the embodiment.

Next, an explanation is given of an example of the functional block of the MFP 1 that is implemented by the hardware of FIG. 1. FIG. 2 is a diagram that illustrates an example of the functional block of the MFP according to the embodiment. As illustrated in FIG. 2, the MFP 1 includes the main body unit 10 and the operating unit 20.

First, the main body unit 10 is explained. As illustrated in FIG. 2, the main body unit 10 includes a communication unit 101, a setting managing unit 102, a first application 111, a second application 112, a third application 113, a fourth application 114, and a fifth application 115. With regard to some of the above-described units, the CPU 11 reads software (program) from the ROM 12 or the HDD 14 and executes it so that each of the above-described units is loaded into the RAM 13, whereby each of the above-described units may be the software (program) that is generated on the RAM 13. Furthermore, all or some of the above-described units may be replaced with a hardware circuit such as a processor that performs arithmetic processing.

The first application 111, the second application 112, the third application 113, the fourth application 114, and the fifth application 115 are the applications that are operated in the main body unit 10, and they are the applications for providing, for example, the copy function, scanner function, fax function, or the like. Here, the application operated in the main body unit 10 is referred to as the main-body unit application. The main-body unit application is not limited to the applications for providing these functions, and a processing unit (software, or the like), which is operated in the main body unit 10 and is capable of importing/exporting setting information, may be the main-body unit application.

The communication unit 101 is connected to the operating unit 20 via the dedicated communication path 40 so as to transmit and receive data to and from the operating unit 20. The communication unit 101 is implemented when the CPU 11 executes a command read from the ROM 12.

The communication unit 101 receives various operation inputs, received by the operating unit 20, and delivers them to the corresponding units. Furthermore, the communication unit 101 transmits the data for displaying, on the operating unit 20, various types of information (e.g., the information that corresponds to a received input, the information that indicates the operation state of the MFP 1, or the information that indicates the setting state). Moreover, the communication unit 101 transmits and receives data to and from an external device (e.g., a client PC) via the communication I/F 15 and the network 30 and delivers it to the corresponding unit.

The setting managing unit 102 manages import requests or export requests for the setting information from a user, or the like, received by a setting managing unit 202 of the operating unit 20. Furthermore, the setting managing unit 102 writes the setting information (an example of the second setting information) on the application operated in the main body unit 10 and the setting information (an example of the first setting information) on the application operated in the operating unit 20 in the ROM 12, the HDD 14, or the like. Here, the application operated in the operating unit 20 is referred to as the operating-unit application. The setting information on the main-body unit application is the information about the settings of the main-body unit application.

The setting information on the operating-unit application is the information about the settings of the operating-unit application. Details of each piece of setting information are described later.

If the setting managing unit 102 receives an import/export execution request for the setting information with regard to the main-body unit application, it requests the main-body unit application to perform a process that corresponds to the received request. Furthermore, if the setting managing unit 102 receives an import/export execution request for the setting information with regard to the operating-unit application, it requests the setting managing unit 202 of the operating unit 20 to perform a process that corresponds to the received request.

The setting managing unit 102 combines the setting information, received from the main-body unit application, and the setting information, received from the setting managing unit 202 of the operating unit 20, and outputs the combined setting information to a user, or the like, via the communication unit 101. Here, the method for combining the setting information is not particularly limited and, for example, it is possible to apply a method for connecting each piece of setting information to obtain the single piece of information.

Next, the operating unit 20 is explained. The operating unit 20 includes a communication unit 201, the setting managing unit 202, a common I/F managing unit 203, a first internal application 211, a second internal application 212, a first additional application 221, a second additional application 222, and a third additional application 223. With regard to some of the above-described units, the CPU 21 reads software (program) from the ROM 22 or the flash memory 24 and executes it so that each of the above-described units is loaded into the RAM 23, whereby each of the above-described units may be the software (program) that is generated on the RAM 23. Furthermore, part of the above-described units may be replaced with a hardware circuit such as a processor that performs arithmetic processing.

The first internal application 211 and the second internal application 212 are the applications that are previously installed in the operating unit 20, and they are high-reliability applications. The first internal application 211 and the second internal application 212 write the setting information to be imported/exported in the ROM 22, the flash memory 24, or the like. Furthermore, the first internal application 211 and the second internal application 212 are collectively referred to as the "internal application".

For example, the internal application may be a display application. The display application controls display of the information on the operation panel 27 in accordance with a request from the library for image display, installed in the main-body unit application. Furthermore, for example, the internal application may be a setting application. The setting application sets the volume of sound of the speaker installed in the operating unit 20, sets the communication method, sets the password at the time of authentication, or the like.

The first additional application 221, the second additional application 222, and the third additional application 223 are the applications that may be additionally installed in the operating unit 20 after a product is shipped, and FIG. 2 illustrates the state where they have been already installed. The first additional application 221, the second additional application 222, and the third additional application 223 are low-reliability applications. The first additional application 221, the second additional application 222, and the third additional application 223 write the setting information to be imported/exported in the ROM 22, the flash memory 24, or the like. Furthermore, the first additional application 221, the second additional application 222, and the third additional application 223 are collectively referred to as the "additional application".

For example, the additional application may be a third-vendor application that is generated by a third party (e.g., a third vendor). External application services may be provided for the third-vendor application. The external application services are provided to conceal the I/F for allowing a third party to generate an application without knowledge of detailed operations or detailed specifications of the main body unit 10, unpublishable I/F, or the like.

Furthermore, in the operating unit 20, the operating-unit applications are not limited to the above-described applications, but processing units (software, or the like), which are operated in the operating unit 20 and are capable of importing/exporting the setting information, may be the operating-unit applications. Moreover, in the operating unit 20, some applications, included in the operating-unit applications, may be operated, and applications other than the operating-unit application may be operated.

The communication unit 201 is connected to the main body unit 10 via the dedicated communication path 40, and it transmits and receives data to and from the main body unit 10. The communication unit 201 is implemented when the CPU 21 executes the command read from the ROM 22.

The communication unit 201 receives an import/export request for the setting information with regard to the operating-unit application from the setting managing unit 102 of the main body unit 10. Furthermore, the communication unit 201 transmits various types of inputs, received by the operating unit 20, to the main body unit 10.

The communication unit 201 receives data to be displayed in the operating unit 20 and delivers various types of information (e.g., the information that corresponds to a received input, the information that indicates the operation state of the MFP 1, or the information that indicates the setting state) to each corresponding unit. Furthermore, the communication unit 201 transmits and receives data to and from an external device (e.g., a client PC) via the communication I/F 25 and the network 30 and delivers it to each corresponding unit.

With regard to an internal application (high-reliability application in the operating unit 20), the setting managing unit 202 controls import or export of the setting information about the settings of the internal application.

The setting managing unit 202 manages an import request or an export request for the internal application. Furthermore, the setting managing unit 202 communicates with the common I/F managing unit 203 so as to manage an import request or an export request for the additional application via the common I/F managing unit 203. Furthermore, the setting managing unit 202 combines the setting information, received from the internal application, and the setting information, received from the common I/F managing unit 203, and transmits the combined setting information to the setting managing unit 102 of the main body unit 10. Moreover, the setting managing unit 202 writes the combined setting information in the HDD 14, or the like, of the main body unit 10. The setting managing unit 202 is implemented when the CPU 21 executes the command read from the ROM 22.

For example, the setting managing unit 202 transmits the import execution request, received from the setting managing unit 102 of the main body unit 10, to the internal application and the common I/F managing unit 203, and it receives an import execution request result from the internal application and the common I/F managing unit 203. Furthermore, for example, the setting managing unit 202 transmits the export execution request, received from the setting managing unit 102 of the main body unit 10, to the internal application and the common I/F managing unit 203, and it receives an export execution request result from the internal application and the common I/F managing unit 203.

With regard to the additional application (the low-reliability application in the operating unit 20), the common I/F managing unit 203 controls import or export of the setting information about the settings of the additional application.

The common I/F managing unit 203 manages an import request or an export request for the additional application. Furthermore, the common I/F managing unit 203 transmits the import/export result, received from the additional application, to the setting managing unit 202 of the operating unit 20. The common I/F managing unit 203 is implemented when the CPU 21 executes the command read from the ROM 22.

For example, the common I/F managing unit 203 transmits the import execution request, received from the setting managing unit 202 of the operating unit 20, to the additional application, and it receives an import execution request result from the additional application. Furthermore, for example, the common I/F managing unit 203 transmits the export execution request, received from the setting managing unit 202 of the operating unit 20, to the additional application, and it receives an export execution request result from the additional application. Furthermore, the I/F, which is provided to the internal application, is not published to the additional application.

With the information processing system according to the present embodiment, the setting information on the high-reliability operating-unit application and the setting information on the low-reliability operating-unit application are imported/exported via different interfaces. Thus, it is possible to provide the system that is capable of normally completing an import/export process with the configuration that includes the main body unit and the operating unit while the low-reliability application's process does not affect the high-reliability application's process.

[Flow of Each Piece of Information During an Export Process]

Next, an explanation is given of the flow of information during an export process.

Figure 3:
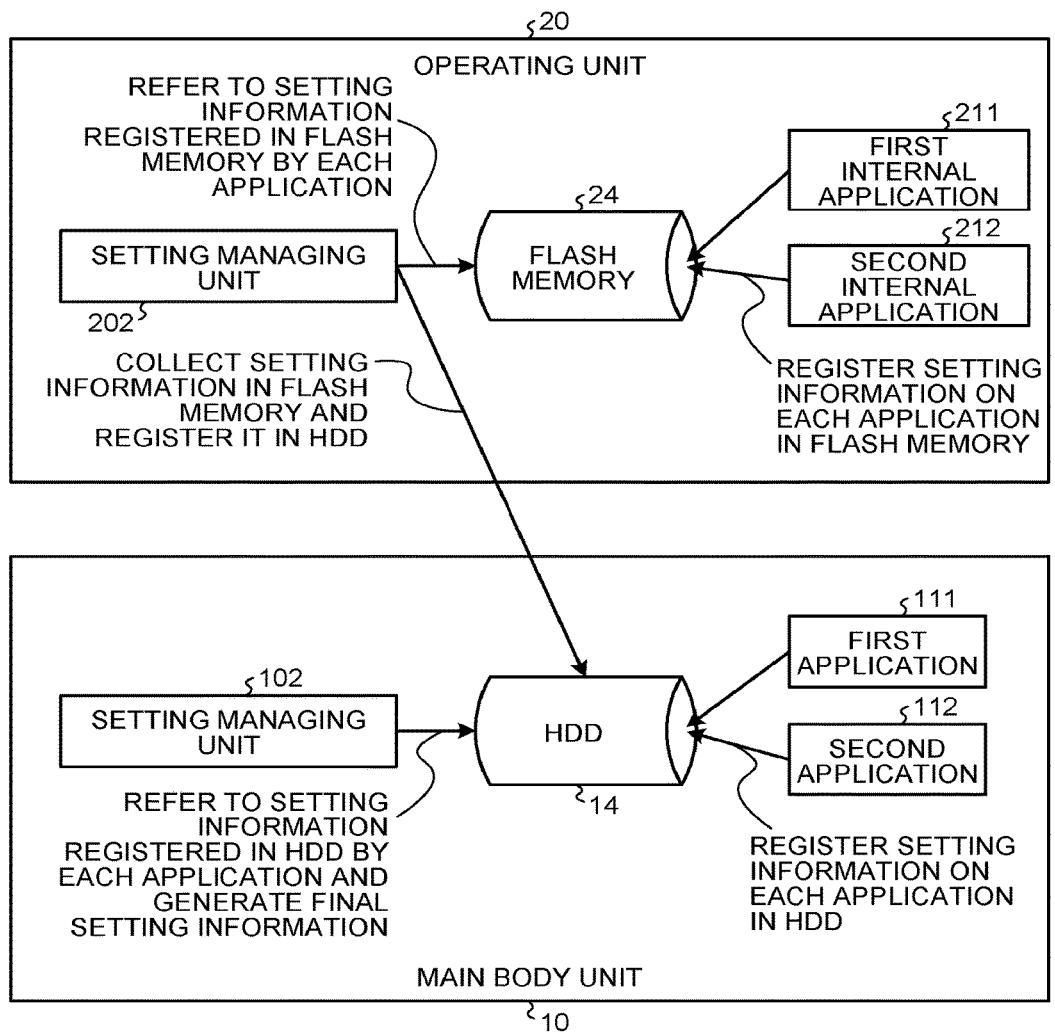
FIG. 3 is a diagram that illustrates the flow of each piece of information during an export process.

FIG. 3 is a diagram that illustrates the flow of each piece of information during an export process. FIG. 3 illustrates an example in which the first application 111, the second application 112, the first internal application 211, and the second internal application 212 are the export targets.

During the export process, each application, which is the export target, stores its own setting information in the storage unit (the HDD 14 or the flash memory 24). For example, the first application 111 and the second application 112 store the setting information in the HDD 14. The first internal application 211 and the second internal application 212 store the setting information in the flash memory 24.

The setting managing unit 202 of the operating unit 20 collects the setting information stored by the application (in the example of FIG. 3, the first internal application 211 and the second internal application 212) in the operating unit 20 and stores it as the export result of the entire operating unit 20 in the HDD 14 of the main body unit 10.

The setting managing unit 102 of the main body unit 10 further combines (edits if needed) the setting information stored in the HDD 14 by each application (including the setting managing unit 202), which is to be externally output, and stores it in the HDD 14.

[Flow of Each Piece of Information During an Import Process]

Next, an explanation is given of the flow of information during an import process.

Figure 4:
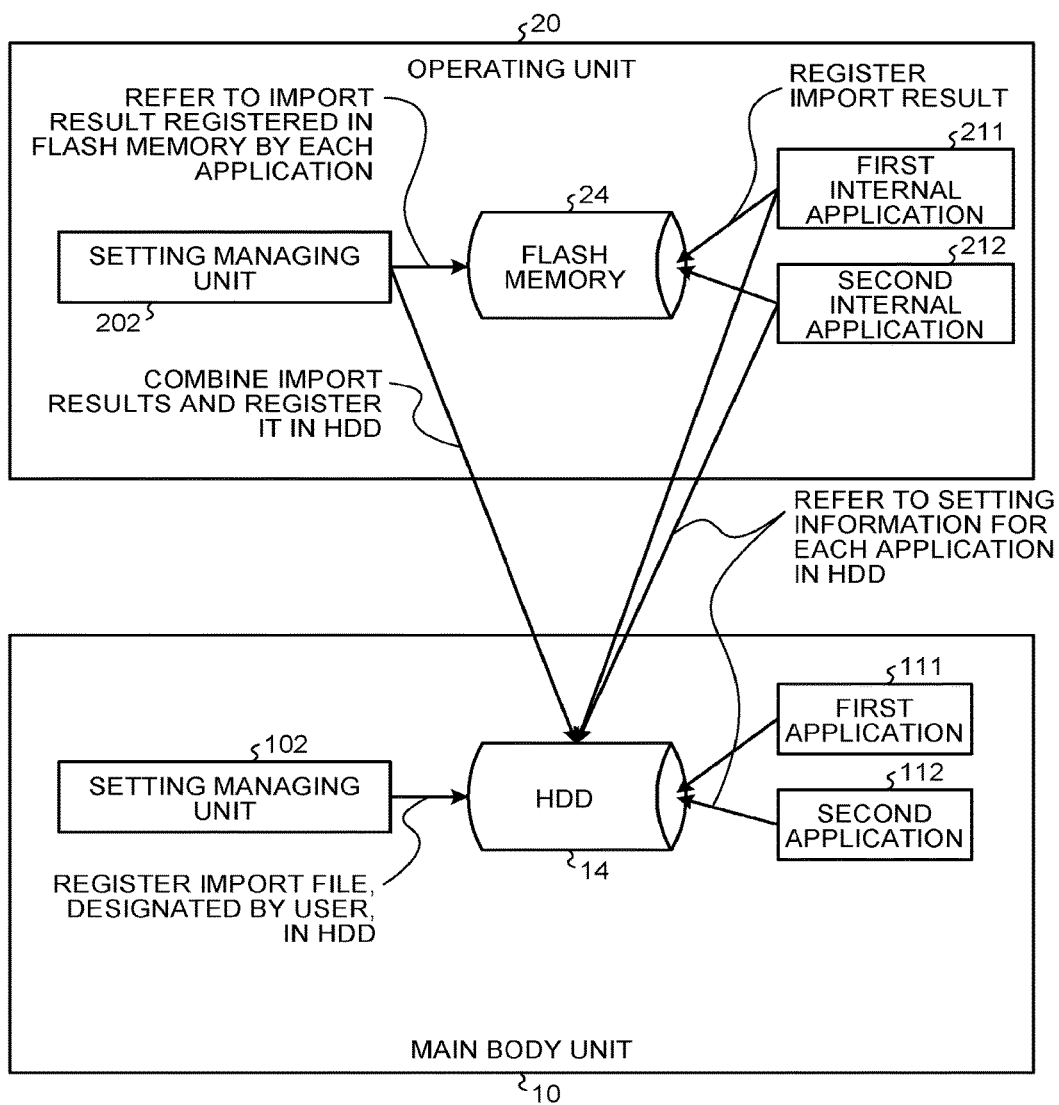
FIG. 4 is a diagram that illustrates the flow of each piece of information during an import process.

FIG. 4 is a diagram that illustrates the flow of each piece of information during an import process. FIG. 4 illustrates an example in which the first application 111, the second application 112, the first internal application 211, and the second internal application 212 are the import targets.

During an import process, the setting managing unit 102 registers the designated import file in the HDD 14. Each application refers to the import file and performs an import process. Each operating-unit application stores the import result in the flash memory 24.

The setting managing unit 202 of the operating unit 20 refers to the import result stored by each application (in the example of FIG. 4, the first internal application 211 and the second internal application 212) in the operating unit 20, collects each import result, and stores it as the import result of the entire operating unit 20 in the HDD 14 of the main body unit 10.

[Example of the Data Structure of the Setting Information]

Next, with reference to FIGS. 5 to 8, an explanation is given of an example of the data structure of the setting information. FIGS. 5 and 6 are diagrams that illustrate an example of the setting information that is processed by the operating-unit application. FIG. 7 is a diagram that illustrates an example of the setting information that is transmitted and received between the operating unit and the main body unit. FIG. 8 is a diagram that illustrates an example of the setting information that is finally generated by the setting managing unit of the main body unit.

FIG. 5 illustrates an example of the setting information on the setting application, which is an example of the operating-unit application. FIG. 6 illustrates an example of the setting information on the launcher, which is an example of the operating-unit application. As illustrated in FIGS. 5 and 6, the setting information includes items, such as "app ID", "item ID", "item name", "confidential information", "unique information", or "setting value".

The app ID is the identification information for identifying an application. For example, the app ID is assigned to the application, which is the export target, in the main body unit 10 and to the setting managing unit 202 of the operating unit 20 that is regarded as the single application. The item ID is the identification information for identifying each setting item included in the setting information. The item name is the name of a setting item.

The confidential information indicates whether the setting item is the information that needs to be confidential. For example, if the setting item is the information that needs to be confidential, "TRUE" is set and, if the setting item is not the information that needs to be confidential, "FALSE" is set. If the confidential information is "TRUE", for example, the setting managing unit 102 of the main body unit 10 may encrypt the setting information (setting value) and export the encrypted setting information.

The unique information indicates whether the setting item is the information unique to the apparatus. For example, if the setting item is the information unique to the apparatus, "TRUE" is set and, if the setting item is not the information unique to the apparatus, "FALSE" is set. The setting value represents the value that is set to the setting item.

FIG. 7 is a diagram that illustrates an example of the setting information that is transmitted and received between the operating unit and the main body unit. The example in FIG. 7 is the setting information in a case where the pieces of setting information, described above in FIGS. 5 and 6, are combined. The setting managing unit 202 of the operating unit 20 collects the setting information generated by the operating-unit application in the operating unit 20 and notifies it to the setting managing unit 102 of the main body unit 10.

FIG. 8 is a diagram that illustrates an example of the setting information that is finally generated by the setting managing unit of the main body unit. The setting managing unit 102 of the main body unit 10 generates the setting information by adding the setting information on the application in the main body unit 10 to the setting information, illustrated in the above-described FIG. 7, and outputs it to outside as the final setting information (export file, or the like).

The example of FIG. 8 illustrates, as the setting information on the application in the main body unit 10, the setting information in which the setting information corresponding to the app ID=3, illustrated in the above-described FIG. 7, is added to the setting information corresponding to the app ID=1.

During the import process according to the present embodiment, the setting information illustrated in FIG. 8 is input as the setting information (import file, or the like) on the import target.

Figure 9:
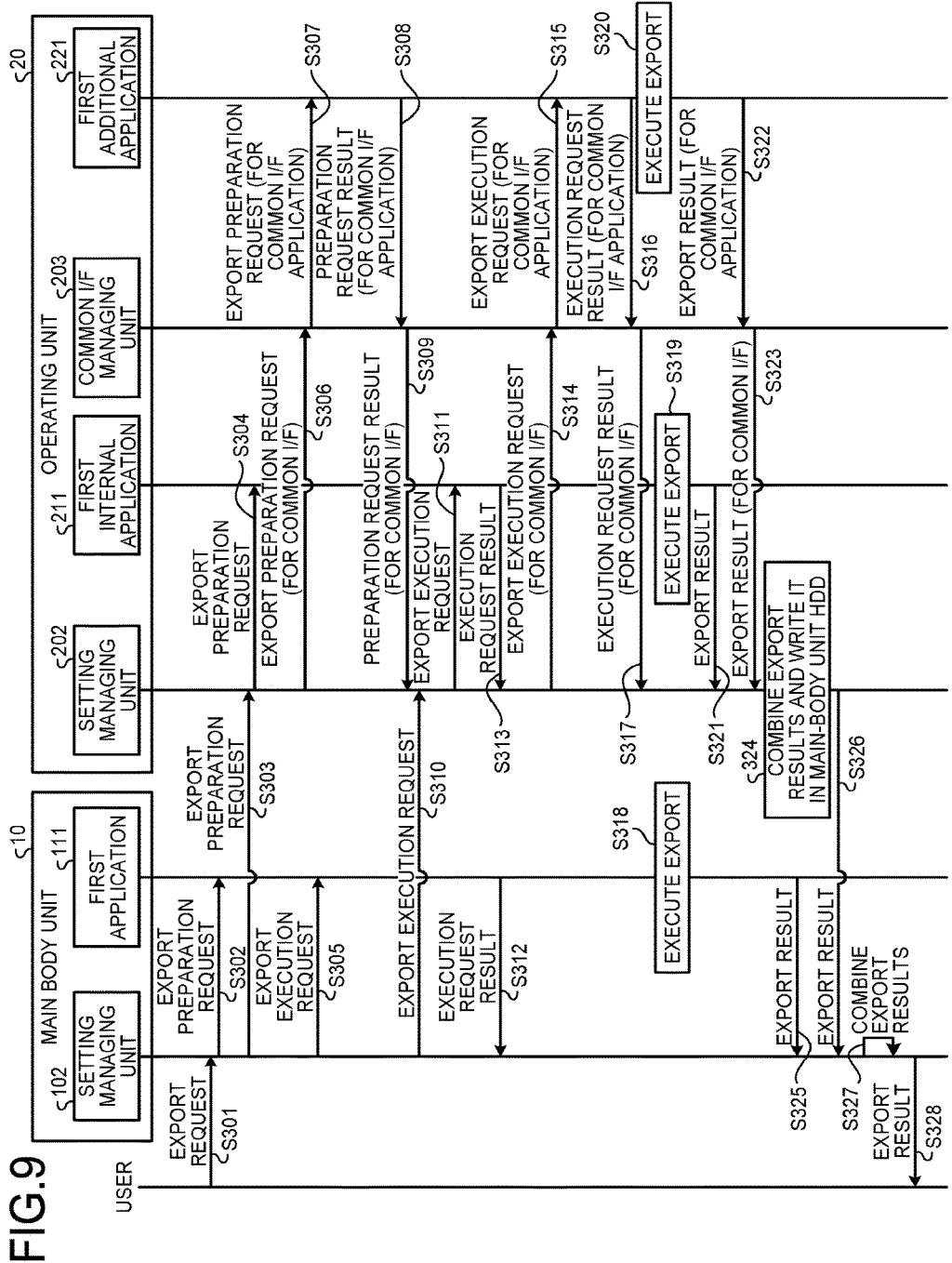
FIG. 9 is a sequence diagram that illustrates an example of the export process according to the embodiment.
Figure 10:
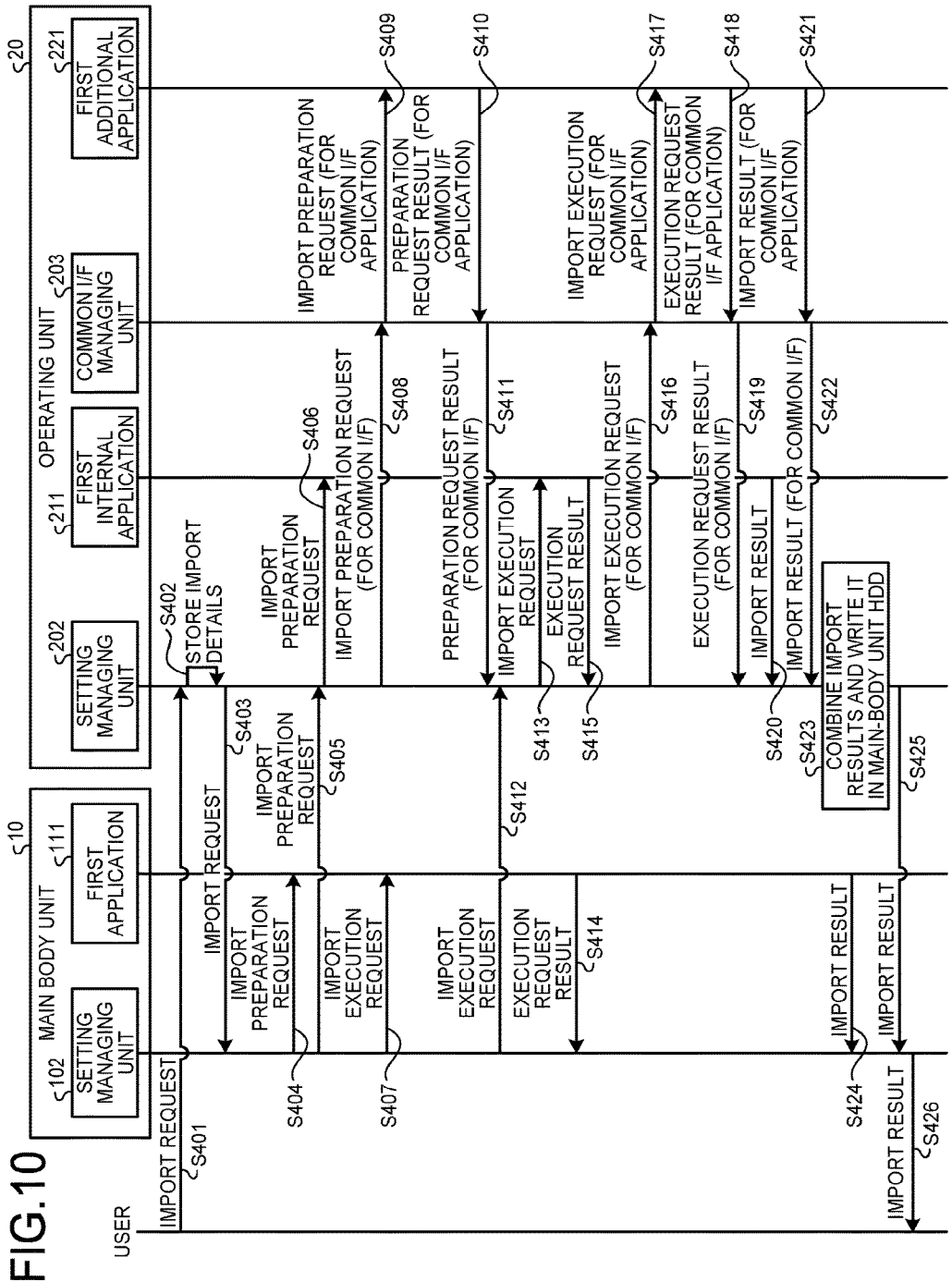
FIG. 10 is a sequence diagram that illustrates an example of an import process according to the embodiment.

Next, with reference to FIGS. 9 and 10, an explanation is given of the specific example of the export process and the import process that are performed by the MFP 1.

[Sequence of the Export Process]

FIG. 9 is a sequence diagram that illustrates an example of the export process according to the embodiment. The sequence illustrated in FIG. 9 is conducted by the setting managing unit 102 of the main body unit 10, the first application 111, the setting managing unit 202 of the operating unit 20, the first internal application 211, the common I/F managing unit 203, and the first additional application 221. Furthermore, examples of the applications in the main body unit 10 and the applications in the operating unit 20 are not limited thereto.

As illustrated in FIG. 9, the setting managing unit 102 of the main body unit 10 receives an export request from outside (e.g., a user) (Step S301). The export request may specify, for example, the application that is the export target, the output destination of the setting information (e.g., export file information) that is finally exported, or the like.

The setting managing unit 102 of the main body unit 10 transmits an export preparation request to the application (in the example of FIG. 9, the first application 111) designated as the export target in the main body unit 10 (Step S302). Furthermore, the setting managing unit 102 of the main body unit 10 transmits an export preparation request to the setting managing unit 202 of the operating unit 20 (Step S303).

After the setting managing unit 202 of the operating unit 20 receives an export preparation request from the setting managing unit 102 of the main body unit 10, it transmits an export preparation request to the application (in the example of FIG. 9, the first internal application 211) designated as the export target in the operating unit (Step S304). As the setting managing unit 202 of the operating unit 20 communicates with an internal application via the I/F that allows immediate responses, it is capable of immediately receiving an export preparation request result from the internal application.

Here, the export preparation request is a request to cause each application to perform a process that is needed before the setting information is exported. If such a process is not necessary, a configuration may be such that an export preparation request is not transmitted.

The setting managing unit 102 of the main body unit 10 determines that the application, which is designated together with the export request, is the export target; however, the application, which is the export target, may be determined by using any method. For example, the setting managing unit 102 of the main body unit 10 may determine that the previously set application is the export target. Furthermore, the setting managing unit 102 of the main body unit 10 may transmit an export preparation request to any application by broadcast, or the like, without designating the destination (application). In this case, if the application, which receives the export preparation request, itself is the export target, it performs the process that corresponds to the request.

In the same manner, the setting managing unit 202 of the operating unit 20 also transmits an export preparation request to the application that is designated together with the export request. Furthermore, if the OS of the operating unit 20 is Android (registered trademark), "sendOrderedBroadcast", or the like, may be used as the transmission by broadcast. If the application, which receives the export preparation request, itself is the export target, it performs the process that corresponds to the request. It may be determined whether the application itself is the export target based on the information that is previously set in the flash memory 24, or the like.

The setting managing unit 102 of the main body unit 10 transmits an export execution request to the first application 111 (Step S305).

After the setting managing unit 202 of the operating unit 20 receives an export preparation request from the setting managing unit 102 of the main body unit 10, it transmits the export preparation request to the common I/F managing unit 203 (Step S306). As the setting managing unit 202 of the operating unit 20 communicates with an additional application via the common I/F managing unit 203, it is not capable of immediately receiving an export preparation request result from the additional application.

After the common I/F managing unit 203 receives an export preparation request from the setting managing unit 202 of the operating unit 20, it transmits the export preparation request to the application (in the example of FIG. 9, the first additional application 221) that is designated as the export target in the operating unit 20 (Step S307).

The common I/F managing unit 203 transmits the export preparation request result, received from the first additional application 221, to the setting managing unit 202 of the operating unit 20 (Steps S308, S309).

The setting managing unit 102 of the main body unit 10 transmits an export execution request to the setting managing unit 202 of the operating unit 20 (Step S310).

After the setting managing unit 202 of the operating unit 20 receives the export execution request from the setting managing unit 102 of the main body unit 10, it transmits the export execution request to the first internal application 211 (Step S311). As is the case with the export preparation request, the export execution request may be transmitted to the application that is the export target, or it may be transmitted by broadcast, or the like.

The setting managing unit 102 of the main body unit 10 receives an export execution request result from the first application 111 (Step S312).

The setting managing unit 202 of the operating unit 20 receives an export execution request result from the first internal application 211 (Step S313).

After the setting managing unit 202 of the operating unit 20 receives the export execution request from the setting managing unit 102 of the main body unit 10, it transmits the export execution request to the common I/F managing unit 203 (Step S314).

After the common I/F managing unit 203 receives the export execution request from the setting managing unit 202 of the operating unit 20, it transmits the export execution request to the first additional application 221 (Step S315).

The common I/F managing unit 203 transmits the export execution request result, received from the first additional application 221, to the setting managing unit 202 of the operating unit 20 (Steps S316, S317).

The first application 111 in the main body unit 10 performs an export process to write its own setting information (export information) in the designated storage unit (e.g., the HDD 14), the previously set storage unit, or the like (Step S318).

The first internal application 211 in the operating unit 20 performs an export process to write its own setting information (export information) in the designated storage unit (e.g., the flash memory 24), the previously set storage unit, or the like (Step S319).

The first additional application 221 in the operating unit 20 performs an export process to write its own setting information (export information) in the designated storage unit (e.g., the flash memory 24), the previously set storage unit, or the like (Step S320).

The setting managing unit 202 of the operating unit 20 receives an export execution result from the first internal application 211 (Step S321). The export execution result includes the information for identifying the application that executes export, the information for identifying the exported setting information, the information that indicates whether the export process is succeeded, or the like, and it includes, for example, the app ID, the storage location of the export file, the name, or the like.

The common I/F managing unit 203 transmits the export execution result, received from the first additional application 221, to the setting managing unit 202 of the operating unit 20 (Step S322, S323).

After the setting managing unit 202 of the operating unit 20 receives an export execution result from the first internal application 211, the setting managing unit 202 reads the setting information on the first internal application 211, stored in the flash memory 24. Furthermore, after the setting managing unit 202 of the operating unit 20 receives an export execution result from the common I/F managing unit 203, the setting managing unit 202 reads the setting information on the first additional application 221, stored in the flash memory 24. Then, the setting managing unit 202 of the operating unit 20 combines the setting information on the first internal application 211 and the setting information on the first additional application 221 and writes the combined setting information in the HDD 14 of the main body unit 10 (Step S324).

The setting managing unit 102 of the main body unit 10 receives an export execution result from the first application 111 (Step S325) and receives the export execution result after the writing process from the setting managing unit 202 of the operating unit 20 (Step S326).

After the setting managing unit 102 of the main body unit 10 receives an export execution result from the first application 111, the setting managing unit 102 reads the setting information on the first application 111, stored in the HDD 14. Furthermore, after the setting managing unit 102 of the main body unit 10 receives the export execution result from the setting managing unit 202 of the operating unit 20, the setting managing unit 102 reads the setting information (the setting information that is the combination of the setting information on the first internal application 211 and the setting information on the first additional application 221) on the operating-unit application, stored in the HDD 14. Then, the setting managing unit 102 of the main body unit 10 combines the export result of the first application 111 and the export result of the operating-unit application and writes the combined export result (the final export result) in the HDD 14 of the main body unit 10 (Step S327).

The setting managing unit 102 of the main body unit 10 outputs the final export result and notifies it to the requester of the export (Step S328).

As described above, the setting managing unit 202 of the operating unit 20 directly communicates with a high-reliability application (e.g., the first internal application 211) and communicates with a low-reliability application (e.g., the first additional application 221) via the common I/F managing unit 203, combines each export result, and transmits the combined export result to the setting managing unit 102 of the main body unit 10. Specifically, with the information processing system according to the present embodiment, in the operating unit, an export process dedicated to high-reliability applications is separated from an export process dedicated to low-reliability applications, whereby the reliability of the system may be improved.

[Sequence of an Import Process]

FIG. 10 is a sequence diagram that illustrates an example of an import process according to the present embodiment. The sequence illustrated in FIG. 10 is executed by the setting managing unit 102 of the main body unit 10, the first application 111, the setting managing unit 202 of the operating unit 20, the first internal application 211, the common I/F managing unit 203, and the first additional application 221. Furthermore, examples of the application in the main body unit 10 and the application in the operating unit 20 are not limited thereto.

As illustrated in FIG. 10, the setting managing unit 202 of the operating unit 20 receives an import request from outside (e.g., a user) (Step S401) and writes the details of the import request in a storage unit (e.g., the flash memory 24) (Step S402). The import request may specify, for example, the application that is the import target.

The setting managing unit 202 of the operating unit 20 transmits the import request to the setting managing unit 102 of the main body unit 10 (Step S403).

The setting managing unit 102 of the main body unit 10 transmits an import preparation request to the application (in the example of FIG. 10, the first application 111) that is designated as the import target in the main body unit 10 (Step S404). Furthermore, the setting managing unit 102 of the main body unit 10 transmits an import preparation request to the setting managing unit 202 of the operating unit 20 (Step S405). As is the case with the export preparation request or the export execution request, the import preparation request may be transmitted to the application that is the import target, or it may be transmitted by broadcast, or the like.

After the setting managing unit 202 of the operating unit 20 receives the import preparation request from the setting managing unit 102 of the main body unit 10, it transmits the import preparation request to the application (in the example of FIG. 10, the first internal application 211) that is designated as the import target in the operating unit 20 (Step S406). As the setting managing unit 202 of the operating unit 20 communicates with the internal application via the I/F that allows immediate responses, it is capable of immediately receiving an import preparation request result from the internal application.

Here, the import preparation request is a request to cause each application to perform a process that is needed before the setting information is imported. If such a process is not necessary, a configuration may be such that an import preparation request is not transmitted.

The setting managing unit 102 of the main body unit 10 transmits an import execution request to the first application 111 (Step S407).

After the setting managing unit 202 of the operating unit 20 receives an import preparation request from the setting managing unit 102 of the main body unit 10, it transmits an import preparation request to the common I/F managing unit 203 (Step S408). As the setting managing unit 202 of the operating unit 20 communicates with the additional application via the common I/F managing unit 203, it is not capable of immediately receiving an import preparation request result from the additional application.

After the common I/F managing unit 203 receives an import preparation request from the setting managing unit 202 of the operating unit 20, it transmits the import preparation request to the application (in the example of FIG. 10, the first additional application 221) that is designated as the import target in the operating unit 20 (Step S409).

The common I/F managing unit 203 transmits the import preparation request result, received from the first additional application 221, to the setting managing unit 202 of the operating unit 20 (Steps S410, S411).

The setting managing unit 102 of the main body unit 10 transmits the import execution request to the setting managing unit 202 of the operating unit 20 (Step S412).

After the setting managing unit 202 of the operating unit 20 receives the import execution request from the setting managing unit 102 of the main body unit 10, it transmits the import execution request to the first internal application 211 (Step S413). As is the case with the import preparation request, the import execution request may be transmitted to the application that is the import target, or it may be transmitted by broadcast, or the like.

The setting managing unit 102 of the main body unit 10 receives an import execution request result from the first application 111 (Step S414).

The setting managing unit 202 of the operating unit 20 receives an import execution request result from the first internal application 211 (Step S415).

After the setting managing unit 202 of the operating unit 20 receives an import execution request from the setting managing unit 102 of the main body unit 10, the setting managing unit 202 transmits an import execution request to the common I/F managing unit 203 (Step S416).

After the common I/F managing unit 203 receives the import execution request from the setting managing unit 202 of the operating unit 20, the common I/F managing unit 203 transmits the import execution request to the first additional application 221 (Step S417).

The common I/F managing unit 203 transmits the import execution request result, received from the first additional application 221, to the setting managing unit 202 of the operating unit 20 (Steps S418, S419).

As an execution request result, the main-body unit application or the operating-unit application may refer to the setting information (import information), each assigned to the storage unit (e.g., the HDD 14), calculate the number of setting items (the number of import executions) that is designated as the target of the import execution request and, among them, return the number of setting items (the planned number of executions) for which an import process is planned to be performed. Furthermore, if the OS of the operating unit 20 is Android (registered trademark), the operating-unit application may reply by using "sendBroadcast", or the like.

The first application 111 in the main body unit 10 performs an import process to read its own setting information (import information) from the designated storage unit (e.g. the HDD 14), the previously set storage unit, or the like, and set the read setting information in each setting item as illustrated in the above-described FIGS. 5 to 8. If an import file is stored in the HDD 14, the first application 111 may use the app ID, the item ID, or the like, to specify and read its own setting information from the setting information in the import file stored in the HDD 14.

The first internal application 211 in the operating unit 20 performs an import process to read its own setting information (import information) from the designated storage unit (e.g. the flash memory 24), the previously set storage unit, or the like, and set the read setting information in each setting item as illustrated in the above-described FIGS. 5 to 8.

The first additional application 221 in the operating unit 20 performs an import process to read its own setting information (import information) from the designated storage unit (e.g. the flash memory 24), the previously set storage unit, or the like, and set the read setting information in each setting item as illustrated in the above-described FIGS. 5 to 8.

The setting managing unit 102 of the main body unit 10 may previously divide (dissolve) the setting information, included in the import file, for each application and store it in the storage unit (e.g., the HDD 14) in the main body unit 10. Furthermore, the setting managing unit 102 of the main body unit 10 may divide only the setting information on the operating-unit application and store it in the storage unit (e.g., the flash memory 24) in the operating unit 20. The operating-unit application is capable of identifying and reading its own setting information from the setting information stored in the flash memory 24.

The setting managing unit 202 of the operating unit 20 receives an import execution result from the first internal application 211 (Step S420). The import execution result includes the information for identifying the application for which import has been executed, the information for identifying the imported setting information, the information that indicates whether an import process has been succeeded, or the like, and it includes for example the app ID, the storage location of the import file, the name, or the like.

The common I/F managing unit 203 transmits the import execution result, received from the first additional application 221, to the setting managing unit 202 of the operating unit 20 (Steps S421, S422).

After the setting managing unit 202 of the operating unit 20 receives an import execution result from the first internal application 211, it reads the setting information on the first internal application 211, stored in the flash memory 24. Furthermore, after the setting managing unit 202 of the operating unit 20 receives an import execution result from the common I/F managing unit 203, it reads the setting information on the first additional application 221, stored in the flash memory 24. Then, the setting managing unit 202 of the operating unit 20 combines the setting information on the first internal application 211 and the setting information on the first additional application 221 and writes the combined setting information in the HDD 14 of the main body unit 10 (Step S423).

The setting managing unit 102 of the main body unit 10 receives the import execution result from the first application 111 (Step S424) and receives the import execution result after the writing process from the setting managing unit 202 of the operating unit 20 (Step S425).

After the setting managing unit 102 of the main body unit 10 receives the import execution result from the first application 111, it reads the setting information on the first application 111, stored in the HDD 14. Furthermore, after the setting managing unit 102 of the main body unit 10 receives the import execution result from the setting managing unit 202 of the operating unit 20, it reads the setting information on the operating-unit application (the setting information that is the combination of the setting information on the first internal application 211 and the setting information on the first additional application 221), stored in the HDD 14. Then, the setting managing unit 102 of the main body unit 10 combines the import result of the first application 111 and the import result of the operating-unit application, outputs the combined import result (the final import result), and notifies it to the requester of the import (Step S426).

As described above, the setting managing unit 202 of the operating unit 20 directly communicates with a high-reliability application (e.g., the first internal application 211), communicates with a low-reliability application (e.g., the first additional application 221) via the common I/F managing unit 203, combines each import result, and transmits the combined import resule to the setting managing unit 102 of the main body unit 10. That is, with the information processing system according to the present embodiment, in the operating unit, an import process dedicated to high-reliability applications is separated from an import process dedicated to low-reliability applications, whereby the reliability of the system may be improved.

[Flowchart that Illustrates an Example of an Export Process]

Figure 11:
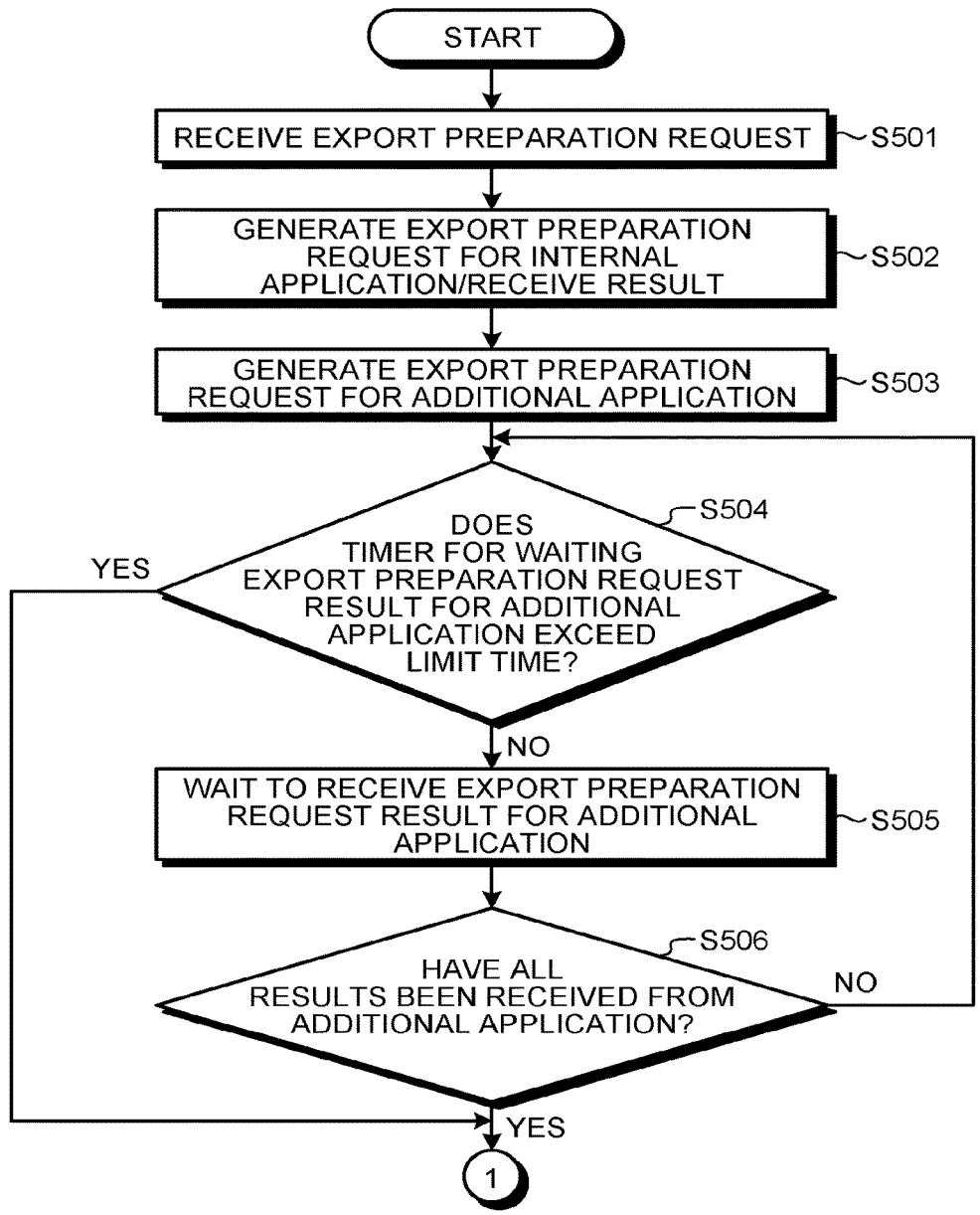
FIG. 11 is a flowchart that illustrates an example of an export process if an export request is received from outside.
Figure 12:
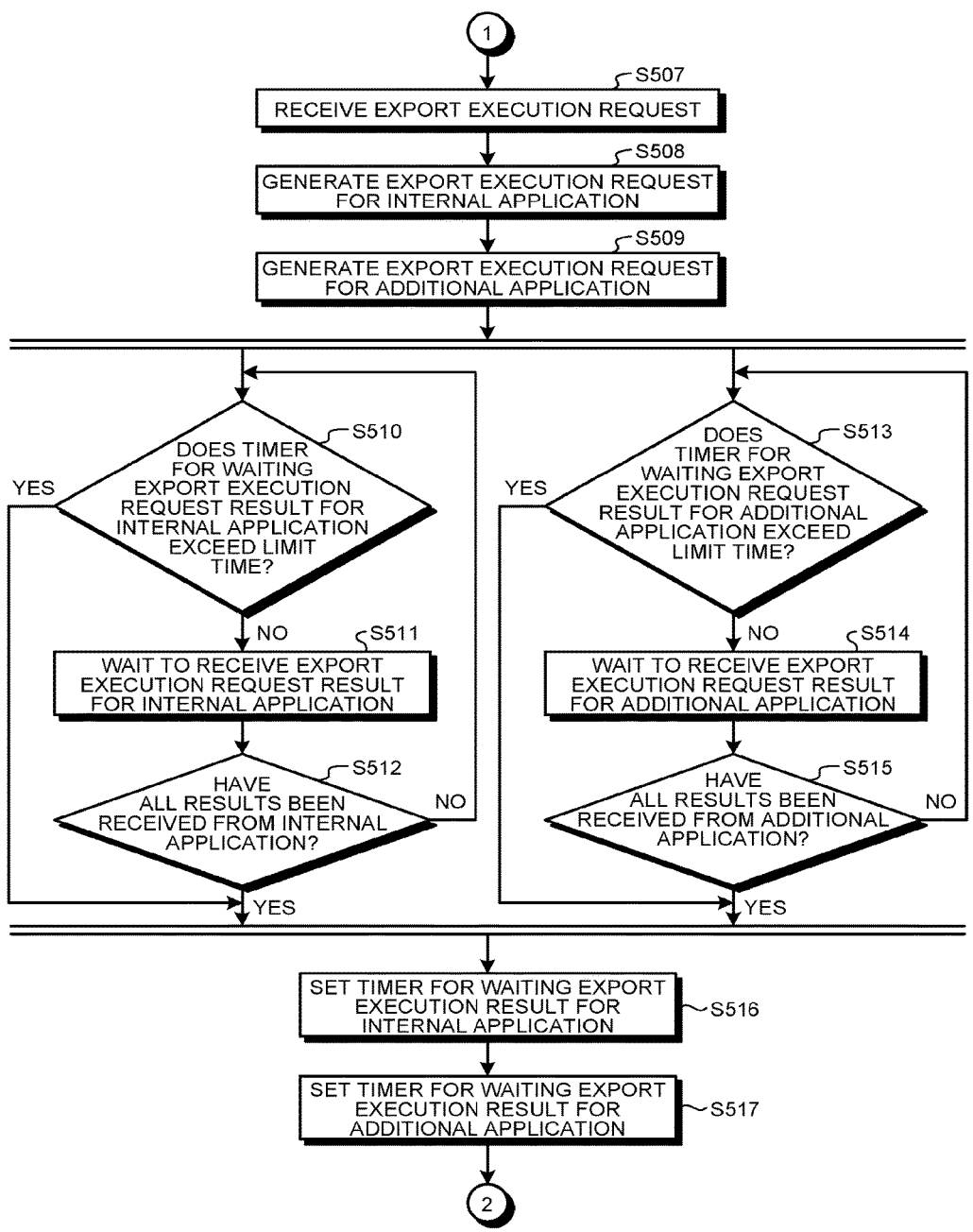
FIG. 12 is a flowchart that illustrates an example of an export process if an export request is received from outside.
Figure 13:
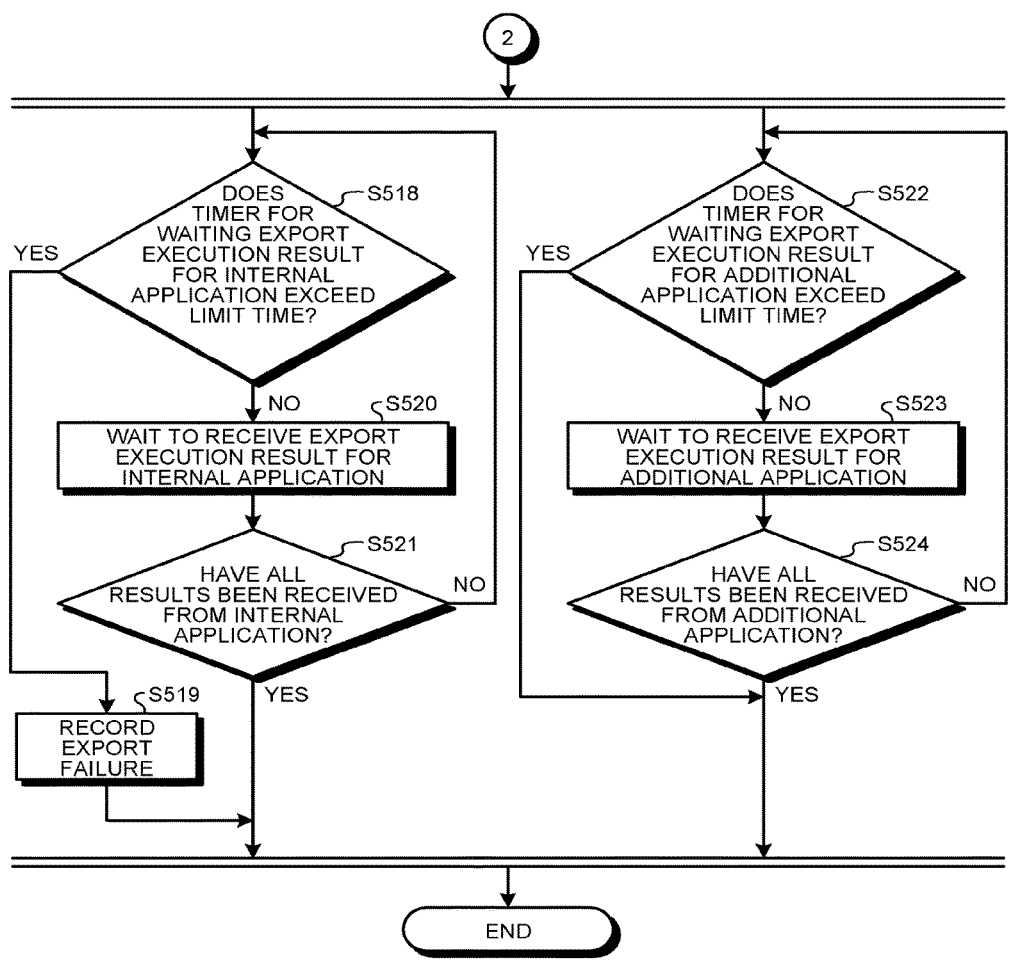
FIG. 13 is a flowchart that illustrates an example of an export process if an export request is received from outside.

Next, with reference to FIGS. 11 to 13, an explanation is given of an example of an export process if an export request is received from outside. Here, although an example of the export process is explained in FIGS. 11 to 13, an import process may be also performed in the same flow.

FIG. 11 illustrates the flowchart after the setting managing unit of the operating unit receives an export preparation request from the setting managing unit of the main body unit until the setting managing unit receives an export preparation request result from the application that is designated as the export target in the operating unit. The process from Step S501 to Step S506 in FIG. 11 is equivalent to the process in FIG. 9 after the setting managing unit 202 of the operating unit 20 receives the export preparation request at Step S303 until the setting managing unit 202 receives the export preparation request result at Step S309.

First, the setting managing unit 202 of the operating unit 20 receives an export preparation request from the setting managing unit 102 of the main body unit 10 (Step S501).

Then, the setting managing unit 202 generates an export preparation request for an internal application (a high-reliability application), transmits the export preparation request to the internal application, and receives an export preparation request result from the internal application (Step S502).

Next, the setting managing unit 202 generates an export preparation request for an additional application (a low-reliability application) and transmits an export preparation request to the additional application (Step S503).

Then, the setting managing unit 202 determines whether the timer for waiting to receive an export preparation request result for the additional application exceeds the limit time (the time-out period) (Step S504). If the timer exceeds the limit time, the setting managing unit 202 performs the operation at Step S507. If the timer does not exceed the limit time, the setting managing unit 202 performs the operation at Step S505.

Then, the setting managing unit 202 waits to receive an export preparation request result from the additional application (Step S505).

Then, the setting managing unit 202 determines whether all the export preparation request results have been received from the additional application (Step S506). If all the export preparation request results have been received from the additional application, the setting managing unit 202 performs the operation at Step S507. If all the export preparation request results have not been received from the additional application, the setting managing unit 202 performs the operation at Step S504.

As described above, as the setting managing unit 202 communicates with an internal application via the I/F that allows immediate responses, the setting managing unit 202 is capable of immediately receiving an export preparation request result from the internal application. Conversely, as the setting managing unit 202 communicates with an additional application via the common I/F managing unit 203, the setting managing unit 202 is not capable of immediately receiving an export preparation request result. Therefore, the setting managing unit 202 waits until all the export preparation request results are received from the additional application which transmits an export preparation request result, or the setting managing unit 202 waits until the limit time elapses.

FIG. 12 illustrates the flowchart after the setting managing unit 202 of the operating unit receives an export execution request from the application that is designated as the export target in the operating unit until the setting managing unit 202 receives an export execution request result. The process at Steps S507 to S517 in FIG. 12 is equivalent to the process in FIG. 9 after the setting managing unit 202 of the operating unit 20 receives the export execution request at Step S310 until the setting managing unit 202 receives the export execution request result at Step S317.

First, the setting managing unit 202 of the operating unit 20 receives an export execution request from the setting managing unit 102 of the main body unit 10 (Step S507).

Next, the setting managing unit 202 generates an export execution request for the internal application and transmits the export execution request to the internal application (Step S508).

Then, the setting managing unit 202 generates an export execution request for the additional application and transmits the export execution request to the additional application (Step S509).

Next, the setting managing unit 202 determines whether the timer for waiting to receive an export execution request result for the internal application exceeds the limit time (the time-out period) (Step S510). If the timer exceeds the limit time, the setting managing unit 202 performs the operation at Step S516. If the timer does not exceed the limit time, the setting managing unit 202 performs the operation at Step S511. The limit time during a standby process for the internal application is set to be longer than the limit time during a standby process for the additional application.

Next, the setting managing unit 202 waits to receive an export execution request result from the internal application (Step S511).

Then, the setting managing unit 202 determines whether all the export execution request results have been received from the internal application (Step S512). If all the export execution request results have been received from the internal application, the setting managing unit 202 performs the operation at Step S516. If all the export execution request results have not been received from the internal application, the setting managing unit 202 performs the operation at Step S510.

The setting managing unit 202 performs the operations at Steps S513 to S515 in parallel with the operations at Steps S510 to S512. The setting managing unit 202 determines whether the timer for waiting to receive an export execution request result for the additional application exceeds the limit time (the time-out period) (Step S513). If the timer exceeds the limit time, the setting managing unit 202 performs the operation at Step S516. If the timer does not exceed the limit time, the setting managing unit 202 performs the operation at Step S514.

Next, the setting managing unit 202 waits to receive an export execution request result from the additional application (Step S514).

Then, the setting managing unit 202 determines whether all the export execution request results have been received from the additional application (Step S515). If all the export execution request results have been received from the additional application, the setting managing unit 202 performs the operation at Step S516. If all the export execution request results have not been received from the additional application, the setting managing unit 202 performs the operation at Step S513.

With regard to an internal application, the setting managing unit 202 performs a standby process based on the assumption that an export process is normally completed (for example, a request result is normally returned during each process); therefore, the limit time (the time-out period) is set to be long. The limit time (the time-out period) may be set on the side of an internal application, and the setting managing unit 202 sets the timer based on the limit time that is applied by the internal application. With regard to high-reliability applications, the limit time may be set on the side of an application so that the reliability of an export process in the system may be improved.

Furthermore, with regard to an additional application, the setting managing unit 202 performs a standby process based on the assumption that an export process is not normally completed (for example, a request result is not returned during each process, or it takes time to return a request result during each process); therefore, the limit time is set to be short. The limit time is a fixed value, and the setting managing unit 202 sets the timer based on the fixed limit time. With regard to low-reliability applications, as the limit time is a fixed value, problems, such as a delay in an export process, a longer time of an export process, or the like, due to errors of a low-reliability application, may be prevented, and the reliability of an export process in the system may be improved.

Next, if the standby process for receiving an export execution request result from the internal application and the additional application is completed, the setting managing unit 202 sets the timer for a standby process for receiving an export execution result with regard to the internal application (Step S516). In the same manner as in the case where the timer is set for the standby process for receiving an export execution request result, it is assumed that an export process is normally completed with regard to an internal application; therefore, the setting managing unit 202 sets the timer on the basis of the time-out period that is applied by the internal application.

Then, the setting managing unit 202 sets the timer for a standby process for receiving an export execution result with regard to an additional application (Step S517). In the same manner as in the case where the timer is set for a standby process for receiving an export execution request result, it is assumed that an export process is not normally completed with regard to an additional application; therefore, the setting managing unit 202 sets the timer on the basis of the fixed limit time.

FIG. 13 illustrates the flowchart after the setting managing unit of the operating unit receives an export execution request result from the application, which is designated as the export target in the operating unit, until the setting managing unit receives an export execution result. The process from Steps S518 to S524 in FIG. 13 is equivalent to the process in FIG. 9 after the setting managing unit 202 of the operating unit 20 receives the export execution request result at Step S317 until the setting managing unit 202 receives the export execution result at Step S323.

First, the setting managing unit 202 of the operating unit 20 determines whether the timer for waiting to receive an export execution result for the internal application exceeds the limit time (Step S518). If the timer exceeds the limit time, the setting managing unit 202 performs the operation at Step S519. If the timer does not exceed the limit time, the setting managing unit 202 performs the operation at Step S520. The limit time (the time-out period) in the standby process for the internal application is set to be longer than the limit time (the time-out period) in the standby process for the additional application.

If the timer exceeds the limit time (if the time-out occurs), the setting managing unit 202 determines that it is an abnormal case, writes an export result in the storage unit (e.g., the HDD 14) as an export process failure (Step S519), and performs an error process.

If the timer does not exceed the limit time (if the time-out does not occur), the setting managing unit 202 waits to receive an export execution result from the internal application (Step S520).

Next, the setting managing unit 202 determines whether all the export execution results have been received from the internal application (Step S521). If all the export execution results have been received from the internal application, the setting managing unit 202 terminates the process. If all the export execution results have not been received from the internal application, the setting managing unit 202 performs the operation at Step S518.

The setting managing unit 202 performs the operations at Step S522 to S524 in parallel with the operations at Steps S518 to S521. The setting managing unit 202 determines whether the timer for waiting to receive an export execution result for the additional application exceeds the limit time (Step S522). If the timer exceeds the limit time, the setting managing unit 202 terminates the process. If the timer does not exceed the limit time, the setting managing unit 202 performs the operation at Step S523.

Even if the timer exceeds the limit time (even if the time-out occurs), the setting managing unit 202 determines that it is a normal case, and it terminates the process without performing an error process. That is, even if a request result is not normally returned from a low-reliability application, the setting managing unit 202 continues the subsequent process without performing an error process. Thus, frequent delays in the process due to errors of low-reliability applications may be prevented, and normal completion of an export process is possible in the entire system.

If the timer does not exceed the limit time (if the time-out does not occur), the setting managing unit 202 waits to receive an export execution result from the additional application (Step S523).

Next, the setting managing unit 202 determines whether all the export execution results have been received from the additional application (Step S524). If all the export execution results have been received from the additional application, the setting managing unit 202 terminates the process. If all the export execution results have not been received from the additional application, the setting managing unit 202 performs the operation at Step S522.

As described above, in the information processing system according to the present embodiment, with the common I/F managing unit 203, even if an export/import process is delayed with regard to a low-reliability application, such as an additional application, an export/import process with regard to a high-reliability application, such as an internal application, is not affected. Therefore, according to the present embodiment, with the configuration that includes the main body unit and the operating unit, an import/export process may be normally completed.

Furthermore, the program executed by the apparatus (the image forming apparatus) according to the present embodiment is provided by being previously installed in a ROM, or the like. Moreover, a configuration may be such that the program executed by the apparatus according to the present embodiment is provided as a computer program product by being recorded, in the form of a file that is installable or executable, in a recording medium readable by a computer, such as a CD-ROM, a flexible disk (FD), a CD-R, or a digital versatile disk (DVD).

Furthermore, a configuration may be such that the program executed by the apparatus according to the present embodiment is stored in a computer connected via a network such as the Internet and provided by being downloaded via the network. Moreover, a configuration may be such that the program executed by the apparatus according to the present embodiment is provided or distributed via a network such as the Internet.

The program executed by the apparatus according to the present embodiment has a modular configuration that includes the above-described units and, in the actual hardware, the CPU (processor) reads the program from the above-described ROM and executes it so as to load the above-described units into a main storage device, whereby each of the units is generated in the main storage device. All or some of the functions of the above-described units may be implemented by a dedicated hardware circuit.

According to exemplary embodiments of the present invention, it is possible to provide an information processing system and an information processing method for normally completing an import/export process in the configuration that includes multiple units.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
    a first unit that receives an operation input from outside the information processing system; and
    a second unit that includes a second memory, is connected to the first unit via a dedicated wired or wireless communication path, is configured to perform a copy function, a scan function, a fax function, or a print function, is formed independently from the first unit, and operates in accordance with the operation input, wherein
    the first unit includes
        a first memory,
        a common managing unit that, with regard to an additional application that is an application to be added to the first unit by installing the additional application in the first memory, controls import or export of first setting information about a setting of the additional application in accordance with an import request or an export request for the first setting information from the outside via the second unit, and
        a setting managing unit that,
            with regard to an internal application that is an application previously installed in the first memory of the first unit, controls import or export of second setting information about a setting of the internal application in accordance with an import request or an export request for the second setting information from the outside via the second unit,
            communicates with the common managing unit,
            combines the second setting information and the first setting information,
            transmits combined information to the second memory of the second unit so that the second unit outputs the combined information to the outside,
            determines that processing is normal when a response is not received before a first time-out period elapses after a processing request about an import or export process of the first setting information with regard to the additional application to be added to the first unit,
            determines that processing is abnormal when a response is not received before a second time-out period elapses after a processing request about an import or export process of the second setting information with regard to the internal application that is previously installed in the first memory of the first unit, and
            in response to determining that the processing is abnormal, writes a result of abnormal processing in the second memory of the second unit, and performs an error process.

2. The information processing system according to claim 1, wherein
    the second time-out period is longer than the first time-out period.

3. The information processing system according to claim 2, wherein the second time-out period is set for the internal application.

4. The information processing system according to claim 3, wherein the second time-out period set for the internal application is set on a side of the internal application, and the first time-out period set for the additional application is a fixed value.

5. The information processing system according to claim 1, wherein
    the first unit is an operating unit of an image forming apparatus, and
    the second unit is a main body unit of the image forming apparatus.

6. The information processing system according to claim 1, wherein the setting managing unit writes the result of the abnormal processing in the second memory of the second unit, which is connected to the first unit via the dedicated wired or wireless communication path, is configured to perform the copy function, the scan function, the fax function, or the print function, is formed independently from the first unit, and operates in accordance with the operation input.

7. An information processing system comprising:
    a first unit that receives an operation input from outside the information processing system, the first unit including a first memory and circuitry that executes functions of the first unit; and
    a second unit that includes a second memory, is connected to the first unit via a dedicated wired or wireless communication path, is configured to perform a copy function, a scan function, a fax function, or a print function, is formed independently from the first unit, and operates in accordance with the operation input, the second unit including circuitry that executes functions of the second unit, wherein the circuitry of the first unit is configured to:

control, with regard to an additional application that is an application to be added to the first unit by installing the additional application in the first memory, import or export of first setting information about a setting of the additional application in accordance with an import request or an export request for the first setting information from the outside via the second unit, control, with regard to an internal application that is an application previously installed in the first memory of the first unit, import or export of second setting information about a setting of the internal application in accordance with an import request or an export request for the second setting information from the outside via the second unit, combines the second setting information and the first setting information, and transmits combined information to the second memory of the second unit so that the second unit outputs the combined information to the outside, determine that processing is normal when a response is not received before a first time-out period elapses after a processing request about an import or export process of the first setting information with regard to the additional application to be added to the first unit, determine that processing is abnormal when a response is not received before a second time-out period elapses after a processing request about an import or export process of the second setting information with regard to the internal application that is previously installed in the first memory of the first unit, and in response to determining that the processing is abnormal, write a result of abnormal processing in the second memory of the second unit, and perform an error process.

8. The information processing system according to claim 7, wherein the second time-out period is longer than the first time-out period.

9. The information processing system according to claim 8, wherein the second time-out period is set for the internal application.

10. The information processing system according to claim 7, wherein the first unit is an operating unit of an image forming apparatus, and the second unit is a main body unit of the image forming apparatus.

11. The information processing system according to claim 7, wherein the circuitry of the first unit and the circuitry of the second unit respectively include a processor.

12. An information processing method that is implemented by an information processing system that includes first circuitry that includes a first memory and receives an operation input from outside the information processing system and second circuitry that includes a second memory, is connected to the first circuitry via a dedicated wired or wireless communication path, is configured to perform a copy function, a scan function, a fax function, or a print function, is formed independently from the first circuitry, and operates in accordance with the operation input, the information processing method comprising:

with regard to an additional application that is an application to be added to the first circuitry by installing the additional application in the first memory, controlling import or export of first setting information about a setting of the additional application in accordance with an import request or an export request for the first setting information from the outside via the second circuitry;

with regard to an internal application that is an application previously installed in the first memory of the first circuitry, controlling import or export of second setting information about a setting of the internal application in accordance with an import request or an export request for the second setting information from the outside via the second circuitry, combining the second setting information and the first setting information, and transmitting combined information to the second memory of the second circuitry so that the second circuitry outputs the combined information to the outside;

determining that processing is normal when a response is not received before a first time-out period elapses after a processing request about an import or export process of the first setting information with regard to the additional application to be added to the first circuitry;

determining that processing is abnormal when a response is not received before a second time-out period elapses after a processing request about an import or export process of the second setting information with regard to the internal application that is previously installed in the first memory of the first circuitry; and in response to determining that the processing is abnormal, writing a result of abnormal processing in the second memory of the second circuitry, and performing an error process.

* * * * *